April 7, 1925.
L. V. McCANN
GLASS CUTTING TABLE
Filed March 13, 1924
1,532,910
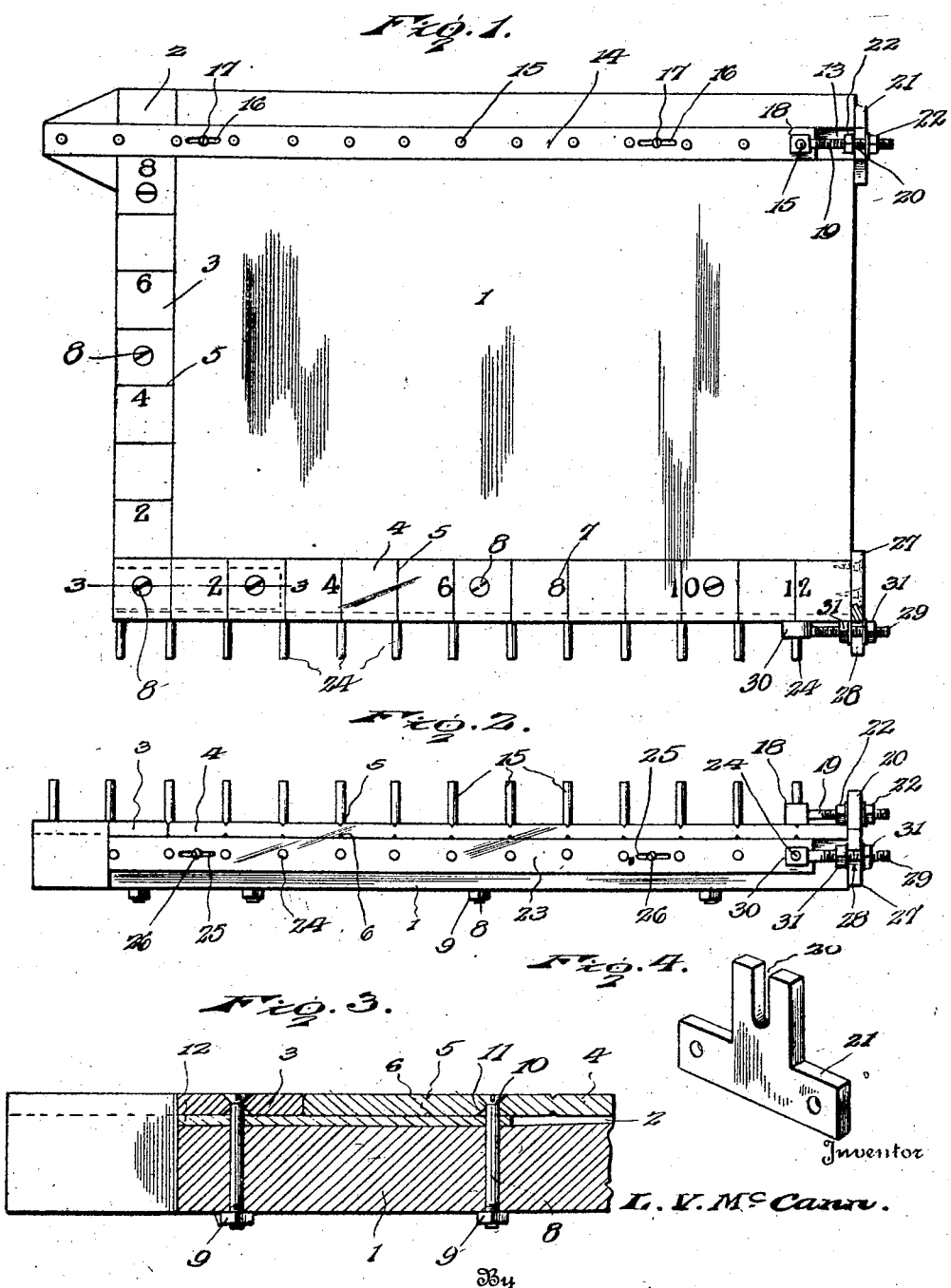

Patented Apr. 7, 1925.

1,532,910

UNITED STATES PATENT OFFICE.

LAURENCE V. McCANN, OF JEANNETTE, PENNSYLVANIA.

GLASS-CUTTING TABLE.

Application filed March 13, 1924. Serial No. 698,974.

*To all whom it may concern:*

Be it known that I, LAURENCE V. Mc-CANN, a citizen of the United States, residing at Jeannette, in the county of Westmoreland and State of Pennsylvania, have invented certain new and useful Improvements in Glass-Cutting Tables, of which the following is a specification.

This invention relates to tables for use in cutting glass and seeks to provide a strong and durable table of inexpensive construction. In the use of glass-cutting tables, the jar incident to the placing of the gage rule upon the table tends eventually to loosen the pin bars, and the scale of graduations marked upon the scale bars become obliterated through constant use so that they cannot be easily read. Particular objects of my invention, therefore, are to provide simple and efficient means whereby the pin bars may be locked in place but may be easily adjusted when tests show that they have been loosened through long-continued use, and also to provide means whereby the legibility of the scale bars or plates may be maintained. Other objects of the invention will appear incidentally in the course of the following description.

In the accompanying drawing:

Figure 1 is a plan view of a glass-cutting table embodying my improvements;

Fig. 2 is an edge elevation of the same;

Fig. 3 is an enlarged detail section on the line 3—3 of Fig. 1, and

Fig. 4 is a detail perspective view of a bracket or bearing plate employed in connection with the means for adjusting the pin bars.

In the drawing, the reference numeral 1 indicates the body of the table which may be of any desired dimensions and of any preferred material provided it is not apt to warp and will always maintain a smooth level upper surface. One side and one end edge of the table 1 is rabbeted, as indicated at 2, to provide seats for the end scale plate 3 and the side scale plate 4. These scale plates are each provided with grooves 5 in its upper face and with similar grooves 6 in its under face, and upon both faces numerals, indicated at 7, are inscribed adjacent the grooves so that a clear legible scale is provided. The scale plates are firmly secured in their respective rabbets by bolts 8 inserted downwardly through the plates and the table 1 and equipped with securing nuts 9 on their lower ends, the upper ends or heads 10 of the bolts being countersunk in the scale plates, as clearly shown in Fig. 3. It will also be noted upon reference to Fig. 3 that both ends of the openings provided in the scale plates to receive the bolts are beveled or countersunk, the lower countersink being indicated by the reference numeral 11 in Fig. 3. As the short glass continually passes across the upper surfaces of the scale plates, the said surfaces become worn and the grooves or scale indications are obliterated, either entirely or partly, so that they cannot be easily read. When this condition has been reached, with my device, the nuts 9 are removed so as to permit the bolts 8 to be withdrawn, after which the scale plates are reversed and the bolts and nuts restored so that the surface of each scale plate which was formerly the lower surface becomes the upper surface and the life of the plate is thereby prolonged without providing a new plate or otherwise reconstructing or rearranging the apparatus. In order that the meeting ends of the scale plates may be maintained flush with each other as well as with the upper surface of the table 1, I provide a locking plate or strip 12 which is seated in the rabbet 2 of the side edge of the plate and bears against the under sides of the scale plates, as shown in Fig. 3. This locking plate is of resilient material so that it tends to lift the ends of the scale plates and consequently, when the nuts 9 are turned home, the several parts will be firmly held in the proper relation In the upper face of the table 1 adjacent the side thereof remote from the scale plate 4, I provide a longitudinal groove 13 in which is fitted the pin bar 14 carrying the upstanding pins 15, these pins being spaced apart according to the graduations or notches 5 and 6 of the scale plate 4 in the usual manner. The pin bar 4 is provided at intervals with longitudinal slots 16 and securing pins or bolts 17 are inserted through said slots into the body of the table 1 to permit and guide the pin bar to be adjusted longitudinally of the table. Adjacent one end of the pin bar 14, the side thereof abuts the end of the scale plate 3 so that the desired right angular relation of the pin bar to said scale plate will be established and maintained. Engaged upon the pin 15 at the opposite end of the bar 14 is the eye 18 of an eye bolt 19 which, as shown in Fig. 1, has its threaded shank extending through the fork 20 of a bracket or bearing plate 21 which is rigidly secured to the adjacent end edge of the table. Securing nuts 22 are fitted upon the threaded shank of the eye bolt 19 at opposite sides of the fork 20 and are turned home against the same to secure the bolt therein and hold the pin bar in a set position. When adjustment of the pin bar is necessary, the nuts 22 are loosened sufficiently to permit the eye bolt 19 to play through the fork 20 and thereby draw the pin bar 14 into such position that the pins 15 thereon are caused to accurately aline with the grooves or notches 5 in the scale plate 4, after which the nuts are again turned home so that the bar will be held in the position in which it has been set. The set screws or bolts 17 are, of course, slightly loosened when the pin bar is to be adjusted and then turned home after it has been adjusted so as to aid the nuts 22 in holding the bar securely.

A pin bar 23 is secured to the side edge of the table 1 below the scale plate 4, and this pin bar carries pins 24 projecting horizontally therefrom, these pins being also so spaced as to correspond to the graduations or grooves 5 in the scale plate. The pin bar 23 is provided with longitudinal slots 25 through which retaining screws or pins 26 are inserted into the edge of the table, and this pin bar, as shown clearly in Fig. 2, rests against the under sides of the scale plates 3 and 4 so as to provide an additional support for the same and prevent the dropping of the outer edges thereof so that the accuracy of the device will be maintained. A bracket or bearing plate 27 is secured to the edge of the table 1 at that side carrying the scale plate 4 and the free end of this bracket or bearing plate is constructed with an open-ended slot 28 to receive the shank of an eye bolt 29 which has its eye 30 engaged upon that pin 24 of the pin bar 23 which is most remote from the end of the scale plate 3. Nuts 31 are mounted upon the shank of the eye bolt 29 at opposite sides of the bearing plate 27 and are adapted to be turned home against said plate so as to secure the plate 27 in a set position. The pin bar 23 may then be easily and accurately adjusted in the same manner that the pin bar 14 is adjusted.

From the foregoing description, taken in connection with the accompanying drawing, it will be seen that I have provided an exceedingly simple device which may be very readily adjusted to maintain the accuracy thereof, and which will be found more durable than the glass-cutting tables now in general use without any increase in the cost of production and upkeep.

Having thus described the invention, I claim:

1. In a glass-cutting table, the combination of a table body having its upper surface rabbeted along one end edge and along one side edge, scale plates seated in the rabbeted portions of the body, and a resilient locking plate seated in the base of the rabbeted portions of the body below the meeting ends of the scale plates.

2. In a glass-cutting table, the combination with a table body, of a pin bar slidably mounted thereon, a bearing plate secured to an end edge of the body, and an eye bolt having its shank secured in said bearing plate and its eye engaged over the pin at the adjacent end of the pin bar.

3. In a glass-cutting table, the combination with a table body, of a pin bar slidably mounted on the body, a bearing plate secured to an end edge of the body and having a slotted portion projecting beyond said edge, an eye bolt having its shank extended through the slotted portion of the bearing plate and its eye engaged over the pin at the adjacent end of the pin bar, and securing nuts mounted upon the shank of the eye bolt and adapted to be turned home against the opposite sides of the bearing plates.

In testimony whereof I affix my signature.

LAURENCE V. McCANN [L. S.]